UNITED STATES PATENT OFFICE.

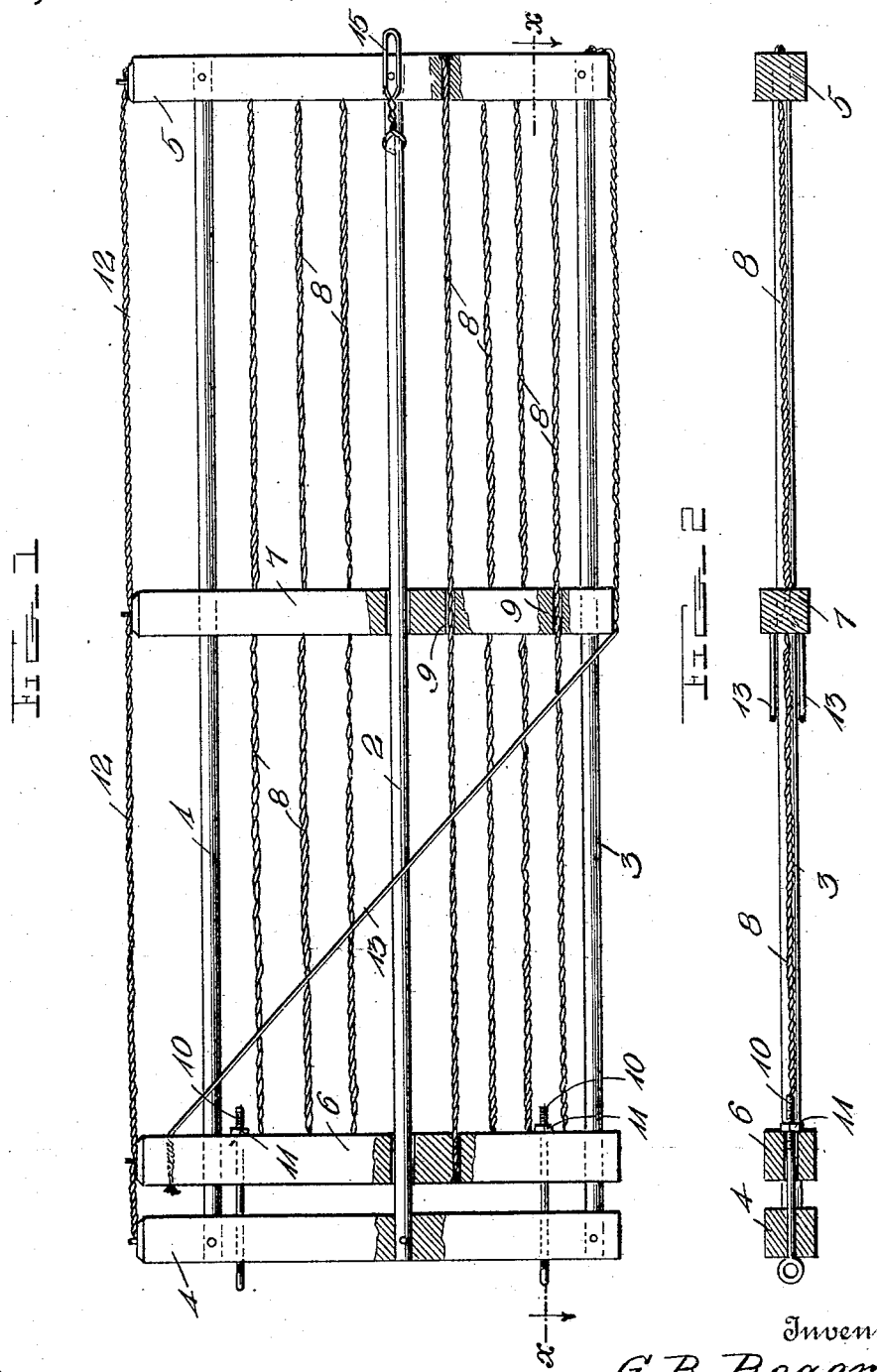

GEORGE R. ROGERS, OF RUSSELLVILLE, INDIANA.

FARM-GATE.

No. 908,331.　　　Specification of Letters Patent.　　　Patented Dec. 29, 1908.

Application filed June 1, 1908. Serial No. 436,068.

*To all whom it may concern:*

Be it known that I, GEORGE R. ROGERS, a citizen of the United States, residing at Russellville, in the county of Putnam and State of Indiana, have invented certain new and useful Improvements in Farm-Gates; and I do declare the following to be a full, clear, and exact description of the invention, such as will enable others skilled in the art to which it appertains to make and use the same.

My invention relates to improvements in gates, and more particularly to farm gates.

It has for its object to provide for the simple, effective and ready securing of the parts of the gate together and taking up slack or looseness especially in the longitudinal members of the gate and to effect the ready assembling of the parts of the gate.

With these and other objects in view, the invention consists of certain novel features of construction, combination and arrangement of parts, as will be more fully described and particularly pointed out in the appended claims.

In the accompanying drawings illustrating the preferred embodiment of my invention, Figure 1 is a side elevation of the invention, Fig. 2 is a horizontal section of the same produced on the line $x$—$x$ of Fig. 1.

In carrying out my invention I construct the gate preferably of three longitudinal bars 1, 2 and 3, arranged at the top, center and bottom of the gate respectively, and end members or uprights 4 and 5 to which the aforesaid members are secured, and two additional upright members 6 and 7. Through the aforesaid upright members are preferably inserted or passed the longitudinal members of the gate and upon said longitudinal members is slidably supported the upright member 6, to which are connected wire strands 8, passing through apertures 9, in the upright member 7 and secured to the upright member 5. The upright member 6 has passing through it the screw threaded shanks 10 of the gate hinges, and upon said screw threaded shanks are arranged nuts 11, adapted to bear against the inner surface of the upright bar or member 6, and by suitably actuating said nuts, the bar 6, it will be noted, is adapted to be moved longitudinally toward the hinge-end of the gate to provide for straining or stretching the wire members of the gate for compensating looseness or slack, as required thus providing a gate which is firm and rigid. An additional wire member 12 may be applied or stretched along the upper ends of the upright or guide members for further bracing or strengthening the gate. Also a bracing member 13 is applied to the gate with the upper ends of its constituent wires passing through the upright bar or member 6 and twisted together or otherwise fastened in place, said brace then extending downwardly and forwardly and carried along the lower edge of the gate in contact with the lower ends of the upright members 7 and 5 and suitably secured to the latter member, the members of said brace being preferably twisted together intermediate of the latter bars.

It will be noted that by means of the aforesaid arrangement of parts in addition to the advantages stated in support thereof, said parts may be previously prepared for forming the gate and may therefore be shipped in knock-down form as in putting up the gate at a distant point. Also said combination and arrangement of parts provide for forming a simple and economical gate, and one which may be readily placed in position. Said gate is also designed to be provided with a loop 15 adapted to be applied for the latching of the gate in place in either direction in which the gate may be swung for opening, the gate being adapted to permit of such movement or opening.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A gate of the character described comprising longitudinal and transverse members, one of said transverse members having connected thereto wire members and slidable upon said longitudinal members, and means for moving the latter transverse member including nut-equipped hinge-members, the nuts of said hinge-members being adapted for engagement with said latter transverse member.

2. A gate of the character described comprising longitudinal top and central members, end transverse members, intermediate transverse members, one of said intermediate transverse members being slidably connected with said longitudinal members, wire longitudinal members connected to the latter transverse member, passed through the other of said intermediate members and secured to the forward end transverse member, and hinge bolt members equipped with nuts and passing through the slidable transverse member, the nuts of said hinge-members being adapted to engage the latter transverse member.

3. A gate of the character described comprising longitudinal members, end transverse members, and intermediate transverse members, one of said intermediate transverse members having slidable connection with said longitudinal members, wire members fixed to one of the end transverse members passing through apertures in one of said intermediate members and connected to the other of said intermediate transverse members, and hinge-bolt members extending through the slidable intermediate member and equipped with nuts adapted to engage said slidable transverse member.

In testimony whereof I have hereunto set my hand in presence of two subscribing witnesses.

GEORGE R. ROGERS.

Witnesses:
W. F. Scott,
R. E. La Follette.